United States Patent
Demirhan

(10) Patent No.: US 7,385,958 B2
(45) Date of Patent: Jun. 10, 2008

(54) AD HOC MODE OF OPERATION IN WIRELESS PERSONAL AREA NETWORKS

(75) Inventor: Mustafa Demirhan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 10/880,629

(22) Filed: Jun. 30, 2004

(65) Prior Publication Data

US 2006/0002349 A1   Jan. 5, 2006

(51) Int. Cl.
*H04Q 7/24* (2006.01)
(52) U.S. Cl. .................................................... 370/338
(58) Field of Classification Search ................. 370/338
See application file for complete search history.

(56) References Cited

U.S. PATENT DOCUMENTS

| 2003/0063619 A1 | 4/2003 | Montano et al. |
| 2003/0128684 A1 | 7/2003 | Hirsch et al. |
| 2004/0053621 A1 | 3/2004 | Sugaya |
| 2005/0169221 A1* | 8/2005 | Bennett ..................... 370/338 |

FOREIGN PATENT DOCUMENTS

WO    WO 2004114598 A1 * 12/2004

OTHER PUBLICATIONS

"Standard 802.15.3", *IEEE*, (Sep. 29, 2003), 169-179.

* cited by examiner

*Primary Examiner*—William Trost
*Assistant Examiner*—Marivelisse Santiago
(74) *Attorney, Agent, or Firm*—The Law Offices of John C. Scott, LLC; John C. Scott

(57) ABSTRACT

Techniques and structures are provided to allow a wireless data device to operate within a wireless personal area network without the use of a centralized coordination function.

24 Claims, 5 Drawing Sheets

AD HOC MODE OF OPERATION IN WIRELESS PERSONAL AREA NETWORKS

TECHNICAL FIELD

The invention relates generally to wireless communication and, more particularly, to wireless personal area networks.

BACKGROUND OF THE INVENTION

Many current wireless personal area network standards call for centralized coordination within a wireless personal area network. Techniques and structures are needed to allow wireless devices to operate within personal area networks without the use of a centralized coordination function.

DETAILED DESCRIPTION

Figure 1:
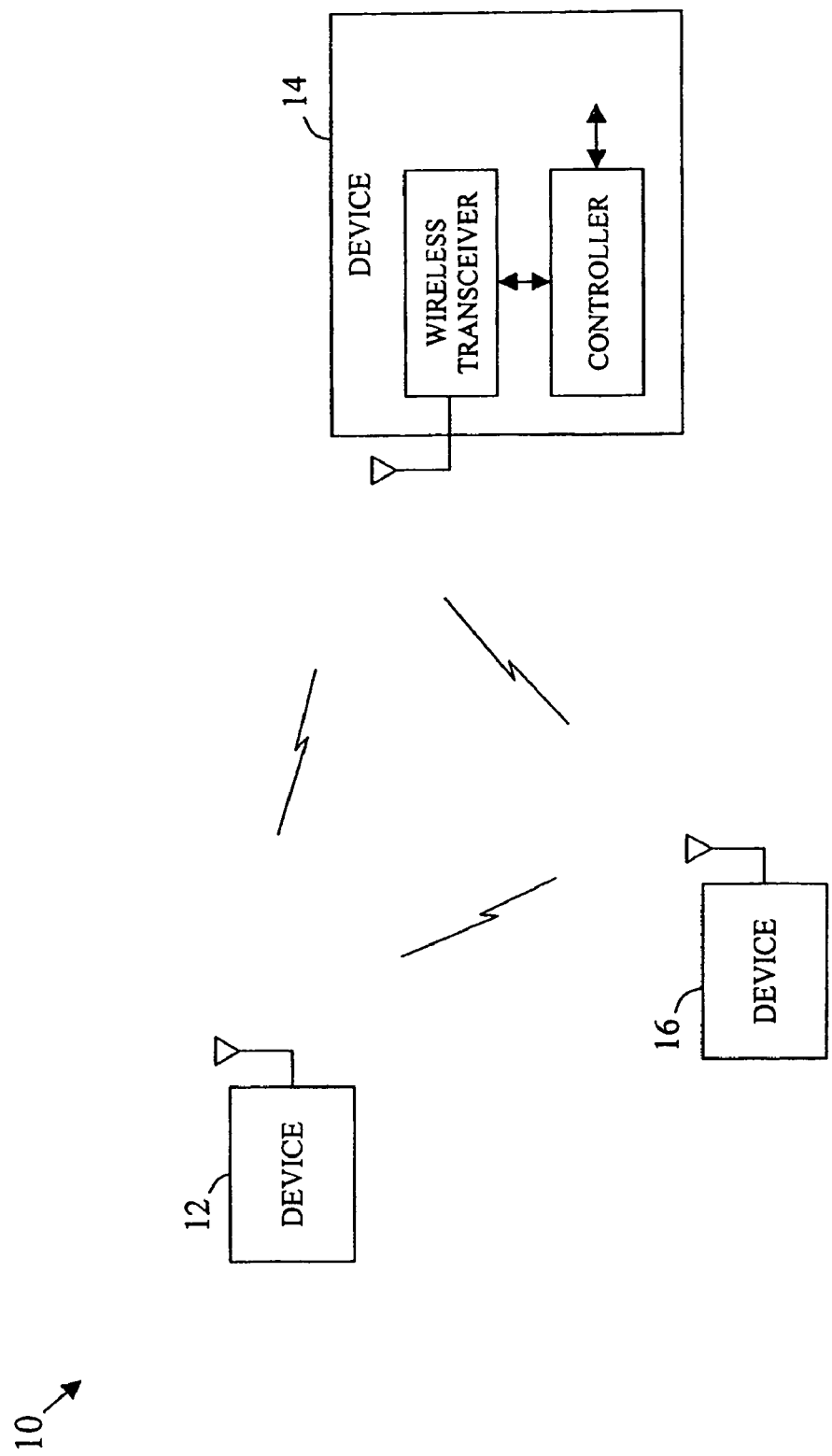
FIG. 1 is a diagram illustrating a wireless personal area network that may incorporate features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating a wireless personal area network (WPAN) 10 that may implement features of the present invention. As shown, the WPAN 10 may include a number of wireless data devices 12, 14, 16 that can communicate with one another using relatively short range wireless links. Although illustrated with three devices, it should be appreciated that any number of devices (i.e., two or more) may form a wireless personal area network. Each of the data devices 12, 14, 16 may include, among other things, a wireless transceiver to support wireless communication and controller functionality to manage communication with the network. The controller functionality may be implemented within one or more digital processing devices. The wireless transceiver may be coupled to one or more antennas to facilitate the transmission of signals into and the reception of signals from a wireless channel. Any type of antennas may be used including, for example, dipoles, patches, helical antennas, antenna arrays, and/or others. The data devices 12, 14, 16 may include any of a wide variety of different device types including, for example, laptop, desktop, palmtop, or tablet computers having wireless networking functionality, computer peripherals having wireless networking capability, personal digital assistants (PDAs) having wireless networking capability, cellular telephones and other handheld wireless communicators, pagers, wireless network interface modules (e.g., wireless network interface cards, etc.) incorporated into larger systems, multimedia devices having wireless networking capability, audio/visual devices having wireless networking capability, home appliances having wireless networking capability, jewelry or other wearable items having wireless networking capability, wireless universal serial bus (USB) devices, wireless digital imaging devices (e.g., digital cameras, camcorders, etc.), wireless printers, wireless home entertainment systems (e.g., DVD/CD players, televisions, MP3 players, audio devices, etc.), and/or others. In one configuration, for example, a wireless personal area network may include a user's laptop computer that is wirelessly communicating with the user's personal digital assistant (PDA) and the user's printer in a short range network. In another possible configuration, a wireless personal area network may be formed between various audio/visual devices in, for example, a user's living room. In yet another configuration, a user's laptop computer may communicate with data devices associated with other user's in a vicinity of the user. Many other scenarios are also possible.

Standards have been developed, and are currently in development, to provide a framework to support development of interoperable products that are capable of operating as part of a wireless personal area network (e.g., the Bluetooth standard (Specification of the Bluetooth System, Version 1.2, Bluetooth SIG, Inc., November 2003), the IEEE 802.15 standards, etc.). The IEEE 802.15.3 standard, for example, is a high data rate wireless personal area network standard. In accordance with the IEEE 802.15.3 standard, one of the data devices within a personal area network (or "piconet") is selected as a Piconet coordinator (PNC) to coordinate the operation of the network. For example, with reference to FIG. 1, data device 12 might be selected as the PNC for the personal area network 10 in an IEEE 802.15.3 implementation. The PNC may perform functions such as, for example, supplying timing for the piconet by transmitting beacon signals, managing quality of service (QOS) for the piconet, managing power save modes for the piconet, managing access control for the piconet, and assigning time slots to the other data devices within the piconet. The time slot assignments may be transmitted by the PNC within the beacon signal. Once a time slot has been assigned to a data device by the PNC, that data device may transmit data within the assigned time slot directly to another data device in the piconet.

Figure 2:
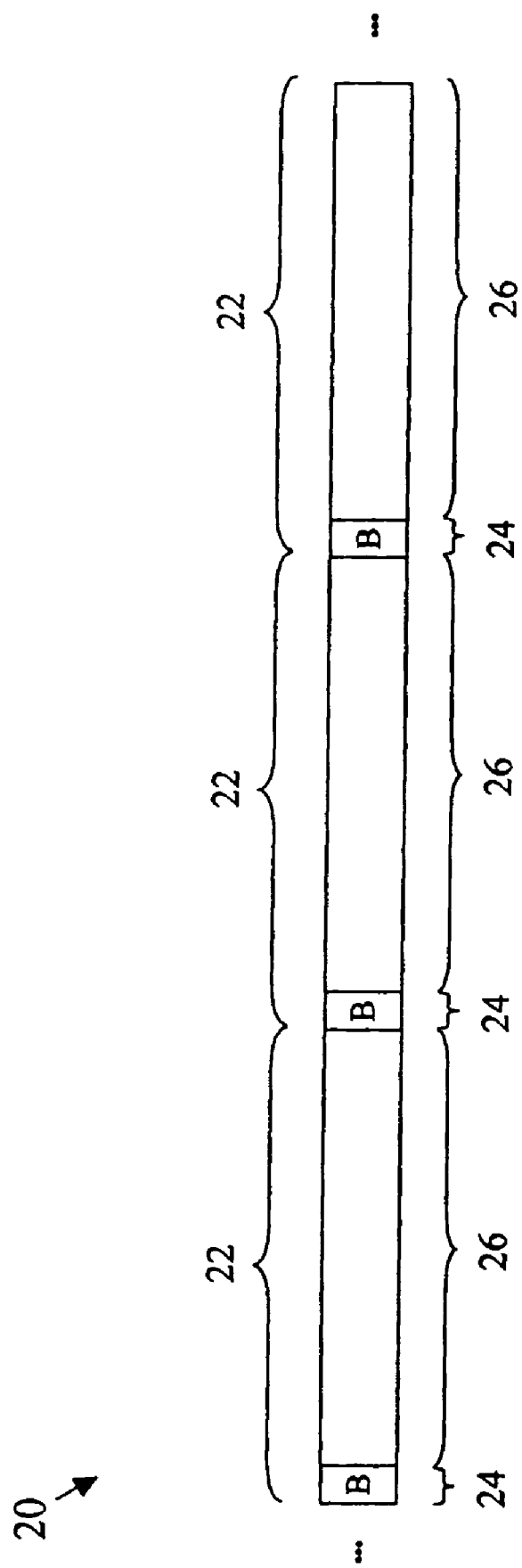
FIG. 2 is a diagram illustrating a signaling scheme within an IEEE 802.15.3 based personal area network.

FIG. 2 is a diagram illustrating a signaling scheme 20 within an IEEE 802.15.3 based personal area network. As shown, wireless communication within the piconet is carried out within a series of superframes 22. At the beginning of each superframe 22, the PNC within the piconet transmits a beacon signal 24. In the remaining portion 26 of the superframe 22, a number of time slots may be defined (e.g., channel time allocations or CTAs). The beacon 24 may include, among other things, time slot assignments for various data streams within the piconet. A data stream typically consists of a transmitter, a receiver, and a stream ID. When a time slot arrives that is assigned to a particular stream, the transmitter associated with the stream is permitted to wirelessly transmit data to the receiver associated with the stream. As illustrated in FIG. 2, the superframes 22 occur one after another. The length of the superframes 22 may vary from frame to frame.

As described above, the IEEE 802.15.3 standard specifies that a piconet coordinator (PNC) be selected to coordinate operations within a piconet. However, in some situations, it may be desirable to allow communication between data devices in a piconet without a PNC being chosen. In addition, in situations where a PNC has already been chosen within a piconet, it may sometimes be desirable that a data device be able to communicate within the piconet without having to interact with the PNC. In one aspect of the present invention, techniques and structures are provided to allow such "ad hoc" communication to take place in a personal area network. Features of the invention may be incorporated into the IEEE 802.15.3 specification with relatively minor changes. Features of the invention may also be implemented within other wireless personal area network standards and specifications.

Figure 3:
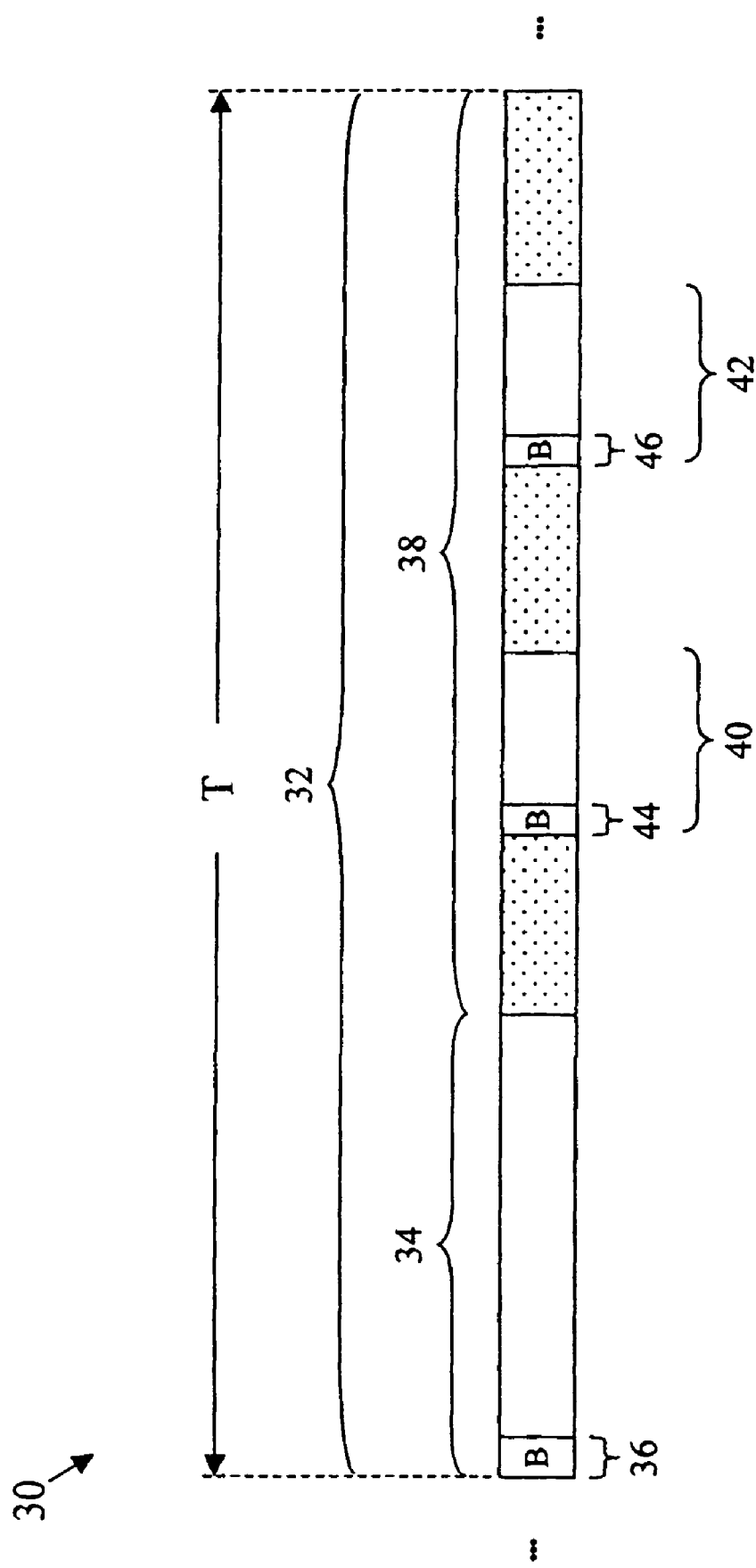
FIG. 3 is a diagram illustrating an example signaling scheme that may be used within a personal area network in accordance with an embodiment of the present invention.

FIG. 3 is a diagram illustrating an example signaling scheme 30 that may be used within a personal area network in accordance with an embodiment of the present invention. As illustrated, wireless communication within a personal area network is organized into repeating cycles 32 having a fixed length T. If a centrally coordinated piconet is present on a given channel, the corresponding superframe 34 will occur within cycle 32. In the illustrated embodiment, the centrally coordinated superframe 34 occurs at the beginning of the cycle 32, although other locations may alternatively be used. A beacon 36 may be transmitted by the corresponding PNC at the beginning of (or elsewhere within) the superframe 34. The beacon 36 may include, among other things, time slot assignments for data devices within the centrally coordinated piconet. These time slot assignments are for time slots within the remaining portion of the superframe 34 (i.e., the portion after the beacon 36).

In addition to the superframe 34, the cycle 32 also includes a second portion 38 that may be used for "ad hoc" (or non-centrally coordinated) communication within the piconet environment. In at least one approach, the second portion 38 of the cycle 32 includes a plurality of individual ad hoc time slots that may be used by ad hoc enabled data devices within the network region. Any number of ad hoc time slots may be made available. In one implementation, for example, 256 time slots are made available. In at least one embodiment of the invention, the number of time slots that are available within the second portion 38 of the cycle 32 may change with time. To transmit data to another data device in a region, an ad hoc enabled data device does not have to first contact a PNC to have one or more time slots assigned to it. In fact, there doesn't even need to be a PNC assigned in the network region for ad hoc based communication between data devices to take place. Instead, an ad hoc enabled data device may first listen to the network channel for a full cycle duration T to identify ad hoc time slots within the cycle 32 that are not currently being used by other data devices. Then, one or more of these unused time slots may be selected by the ad hoc enabled data device. In at least one embodiment, the time slot(s) is (are) selected at random from amongst the available slots (although other approaches may alternatively be used). Once one or more ad hoc time slots have been selected, the ad hoc device is permitted to transmit data within the selected time slot(s) (e.g., within a subsequent cycle 32).

As shown in FIG. 3, in one example situation, the second portion 38 of the cycle 32 may include a first ad hoc superframe 40 and a second ad hoc superframe 42 within corresponding time slots. Within each ad hoc superframe 40, 42, the corresponding ad hoc enabled data device will transmit a beacon signal 44, 46. The beacon signal 44, 46 transmitted by each ad hoc data device may include, for example, information identifying the corresponding data device, information indicating what the corresponding data device intends to do within the associated time slot (e.g., transmit data to another identified data device, etc.), and/or other types of information. In at least one embodiment of the invention, an ad hoc enabled data device may be permitted to select more than one ad hoc time slot within the second portion 38 of the cycle 32 for use in communicating. A data device may decide, for example, that more than one time slot is needed to carry out a particular communication task (i.e., higher bandwidth is needed). If a data device is permitted to select multiple time slots, the corresponding ad hoc beacon signal may include information indicating the time slots that will be used for the identified communication task.

If an ad hoc enabled data device detects a collision within a selected time slot or a clear to send (CTS) indication is never received, then appropriate backoff procedures may be followed. For example, when a collision is detected, an ad hoc enabled data device may immediately stop sending data within the time slot and repeat the process of selecting a time slot (as described above). Thus, in a subsequent cycle 32, a different time slot (or slots) may be selected by the ad hoc enabled data device to avoid the collision.

In at least one embodiment of the invention, a PNC will be able to expand the length of the centrally coordinated superframe 34 within the cycle 32 if needed. However, the total length of the cycle 32 will remain constant from cycle to cycle. In one possible approach, if a PNC wishes to expand the centrally coordinated superframe 34, it merely advertises this in its beacon 36. Ad hoc enabled data devices may listen to the PNC beacon 36 to determine that the centrally coordinated superframe length has been increased. If the centrally coordinated superframe length has been increased to the point where it now overlaps a time slot being used by an ad hoc enabled data device, the data device may select another time slot or slots that are not being used by the centrally coordinated piconet or other ad-hoc enabled devices. One potential problem with the above described technique is that it may require ad-hoc data devices to continuously listen for a PNC beacon, even when there is no PNC operating within the channel.

In another possible approach, when a PNC determines that it needs to expand the length of the centrally coordinated superframe 34, it sends an interference signal (e.g., a black burst) to jam the desired time slots within the second portion 38 of the cycle 32. If one or more ad hoc enabled data devices are using these time slots, the interference signal will create collisions within the time slots that will cause the ad hoc enabled data devices to stop transmitting and switch to other time slots. The centrally coordinated piconet may then begin to use the freed time slots within the next cycle.

Figure 4:
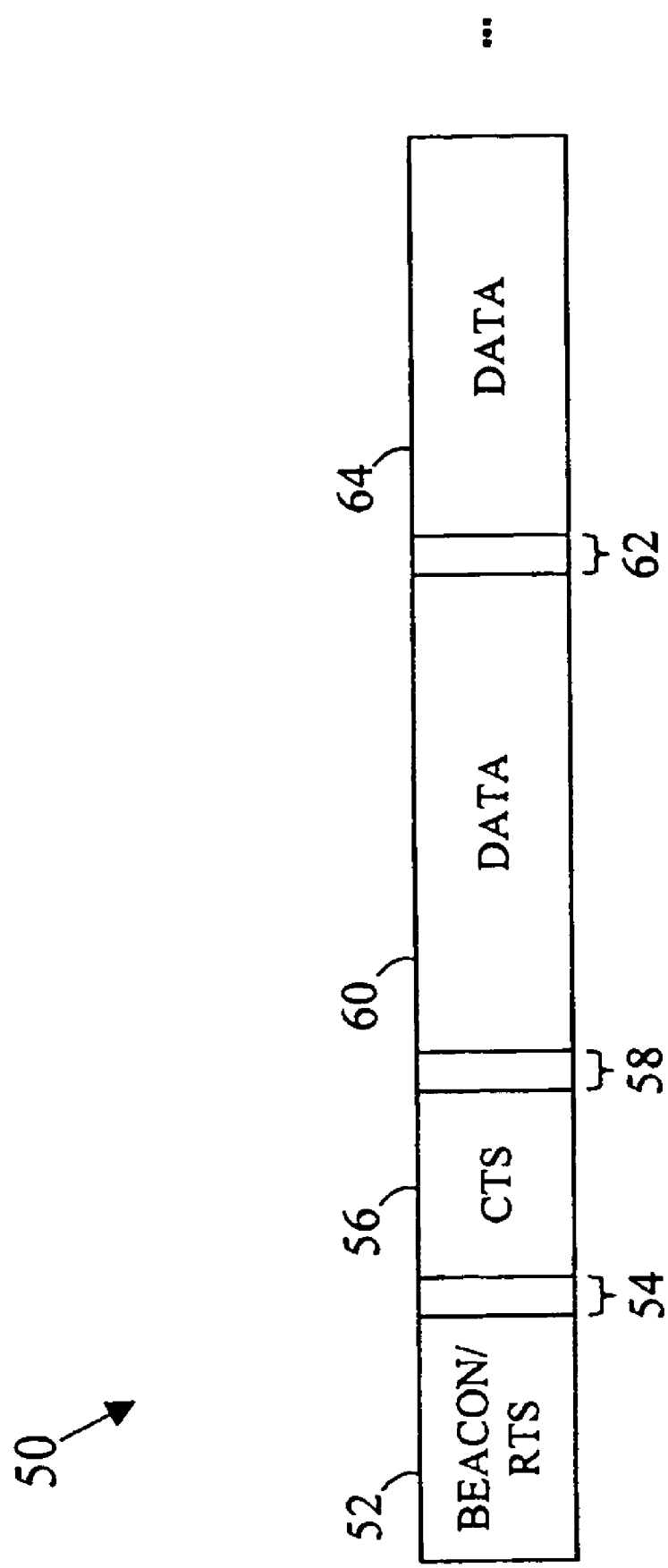
FIG. 4 is a diagram illustrating the contents of an example ad hoc superframe in accordance with an embodiment of the present invention.

FIG. 4 is a diagram illustrating the contents of an example ad hoc superframe 50 in accordance with an embodiment of the present invention. As illustrated, the ad hoc superframe 50 may include one or more of: an ad hoc beacon 52 that includes a request to send (RTS) packet, a clear to send (CTS) packet 56, and one or more data streams 60, 64. As described previously, the ad hoc beacon 52 may be transmitted by an ad hoc enabled data device at the beginning of its selected ad hoc time slot. Among other things, the ad hoc beacon 52 may include information indicating what the corresponding data device intends to do within the associated time slot (e.g., transmit data to another identified data device, etc.). As described above, the ad hoc beacon 52 may also include an RTS packet which can be detected by the data device to which data is to be transmitted. When a data device detects an RTS packet directed to itself, it returns a CTS packet to the originating device that indicates that the RTS packet was received and it is now clear to transmit. A short interframe space (SIFS) 54 may be present between the beacon 52 and the CTS packet 56. After the originating data device receives the CTS packet 56, it begins to transmit a data stream 60 to the other data device (i.e., after another SIFS 58). One or more additional data streams 64 may also be transmitted after the first data stream 60. The data streams 60, 64 may be separated by a SIFS 62 (or a minimum interframe space (MIFS), etc.). If an ad hoc enabled data device transmits an RTS and does not receive a CTS in return, the data device may decide to switch to another ad hoc time slot. Non-receipt of a CTS may indicate, among other things, that a collision has occurred within the time slot.

Figure 5:
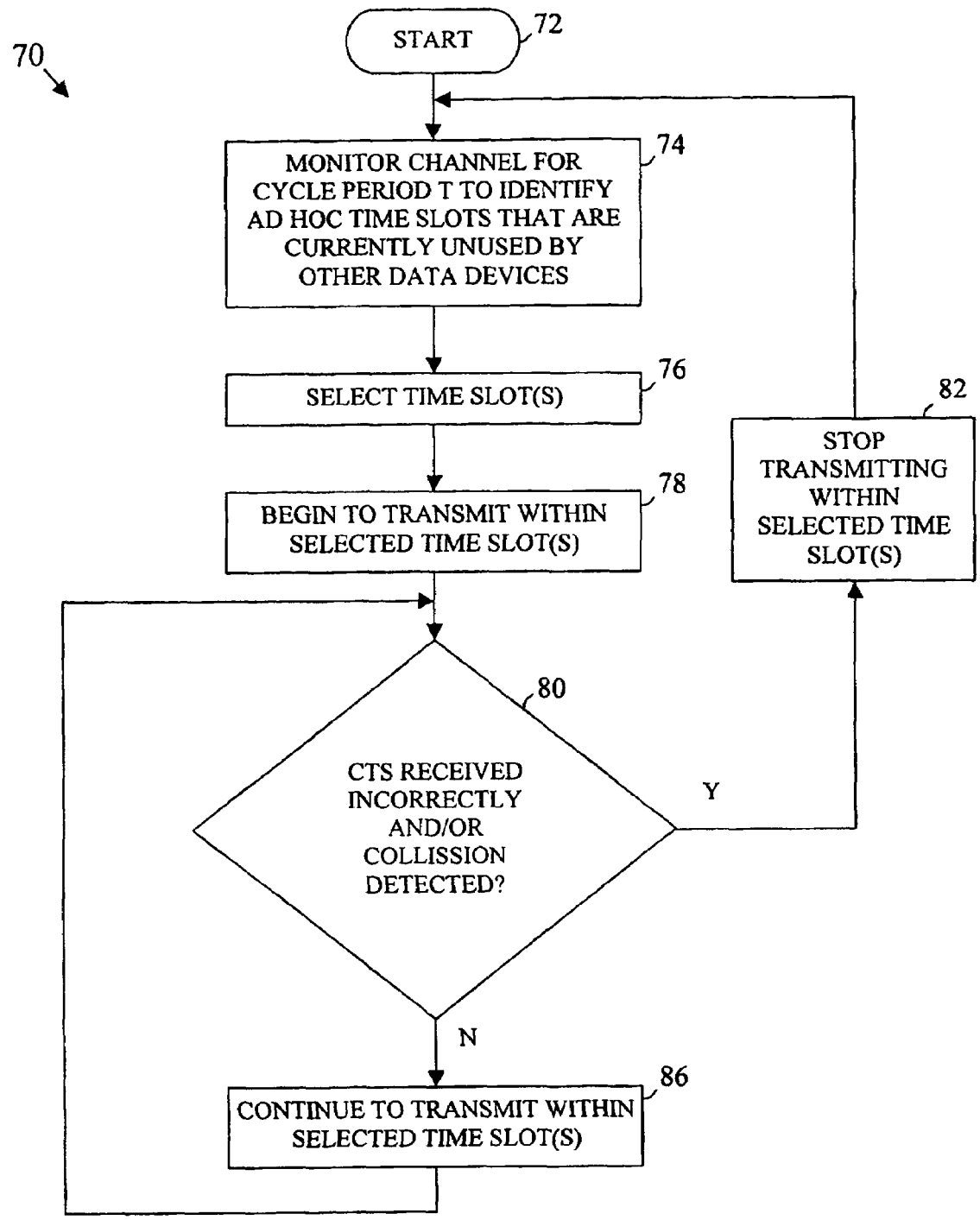
FIG. 5 is a flowchart illustrating an example method for use by an ad hoc enabled data device in accordance with an embodiment of the present invention.

FIG. 5 is a flowchart illustrating an example method 70 for use by an ad hoc enabled data device in accordance with an embodiment of the present invention. The method 70 starts when the ad hoc enabled data device determines that it wants to transmit data within a network (block 72). The ad hoc data device then monitors a network channel for at least a cycle period T to identify ad hoc time slots that are currently unused by other data devices (block 74). The ad hoc data device then selects one or more of the identified time slots (block 76). In at least one embodiment, the ad hoc data device selects one or more time slots at random from amongst the identified time slots (although other selection techniques may alternatively be used). The ad hoc data device may then begin to transmit within the selected time slot(s) (block 78). For example, referring back to FIG. 4, the ad hoc data device may transmit a beacon 52 within a selected time slot and then start transmitting a data stream 60 after a CTS 56 has been successfully received. This may be repeated in subsequent occurrences of the same time slot(s) in future cycles 32. During operation within the selected time slot(s), if the CTS is received incorrectly and/or a collision is detected, the ad hoc data device may stop transmitting within the time slot (block 82), monitor the channel to identify other ad hoc time slots that are currently unused (block 74), and ultimately select another time slot or time slots to operate within (block 76). Otherwise, the ad hoc data device will continue to operate within the selected time slot(s) (block 86). If a PNC that is operating within the same network channel wishes to use, for its centrally controlled piconet, a time slot that is currently being used by the ad hoc enabled data device, the PNC may transmit an interference signal within the time slot and the ad hoc enabled data device will move.

As described previously, in at least one implementation, there does not have to be a centrally coordinated piconet (with a corresponding PNC) active within a channel for an ad hoc enabled data device to communicate with one or more other data devices within the channel. The ad hoc enabled data device may simply, as described above, monitor the channel for at least the cycle period T to identify unused ad hoc time slots and select one or more of the slots in which to operate.

In at least one embodiment of the invention, when a regular IEEE 802.15.3 data device (i.e., a device that is configured to operate in centrally coordinated mode) desires to transmit information in a network that allows ad hoc devices, the regular data device (like the ad hoc device) will first need to listen to the channel for at least the entire cycle period T. During this period, the regular data device may search for a regular (i.e., centrally coordinated) IEEE 802.15.3 piconet. The regular data device may also search for the time slots that are not in use by other devices. If a regular piconet is found, the data device may join that piconet either by becoming a member or by becoming a child/neighbor piconet of the regular piconet. If a regular piconet is not found, the regular data device should create a new regular piconet and start beaconing as a PNC (assuming the device is PNC enabled).

In at least one embodiment of the invention, dual mode data devices may be provided that are capable of operating as both conventional 802.15.3 devices and ad hoc 802.15.3 devices. In such a device, a user may be permitted to manually set the current mode of operation of the device. Alternatively, or in addition, a dual mode device may be able to switch between conventional and ad hoc modes of operation automatically (e.g., based on current conditions within the channel, etc.).

In the above description, the invention has been discussed in the context of an IEEE 802.15.3 system and using IEEE 802.15.3 terminology. However, many of the inventive features may also be applied within non-IEEE 802.15.3 systems.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
    monitoring a network channel from a wireless data device for at least a time period T to identify ad hoc time slots that are not currently being used by other data devices, said time period T being a duration of a repetitive cycle within said network channel, wherein said ad hoc time slots are time slots that can only be used for non-centrally coordinated communication;
    selecting at least one time slot from the identified ad hoc time slots for use in transmitting data from said wireless data device;
    beginning to transmit within said at least one time slot; and
    ceasing transmission within said at least one time slot when a predetermined condition is detected within said at least one time slot;
    wherein each cycle of duration T within said network channel includes a first portion for centrally coordinated wireless communication and a second portion for non-centrally coordinated wireless communication, said second portion including a plurality of ad hoc time slots and said first portion including no ad hoc time slots.

2. The method of claim 1, wherein:
said predetermined condition includes at least one of: a collision being detected within said at least one time slot and a clear to send (CTS) indication not being properly received within said at least one time slot.

3. The method of claim 1, further comprising:
repeating monitoring, selecting, and beginning to transmit after ceasing transmission.

4. The method of claim 1, wherein:
selecting includes randomly selecting a time slot from the identified ad hoc time slots.

5. The method of claim 1, wherein:
said duration T of said repetitive cycle does not change with time but durations of said first and second portions of said repetitive cycle are permitted to change with time.

6. The method of claim 1, wherein:
said first portion of each cycle occurs before said second portion.

7. The method of claim 1, wherein:
communication within said first portion of each cycle is coordinated by a piconet coordinator (PNC) and communication within said second portion is not coordinated by a PNC.

8. A wireless device comprising:
a wireless transceiver; and
a controller, coupled to said wireless transceiver, to manage communication between said wireless device and a wireless network, wherein said controller is programmed to: (a) monitor wireless communication within a network channel for at least a time period T to identify ad hoc time slots that are not currently being used by other wireless devices, said time period T being a duration of a repetitive cycle within said network channel, wherein said ad hoc time slots are time slots that can only be used for non-centrally coordinated communication, (b) select at least one ad hoc time slot from those identified, (c) begin to transmit within said at least one ad hoc time slot, and (d) cease transmission within said at least one time slot when a predetermined condition is detected, wherein each cycle of duration T within said network channel includes a first portion for centrally coordinated wireless communication and a second portion for non-centrally coordinated wireless communication, said second portion including a plurality of ad hoc time slots and said first portion including no ad hoc time slots.

9. The wireless device of claim 8, wherein:
said predetermined condition includes at least one of: a collision being detected within said at least one time slot and a clear to send (CTS) indication not being properly received within said at least one time slot.

10. The wireless device of claim 8, wherein:
said controller selects said at least one ad hoc time slot at random from the identified ad hoc time slots.

11. The wireless device of claim 8, wherein:
said duration T of said repetitive cycle does not change with time but durations of said first and second portions of said repetitive cycle are permitted to change with time.

12. The wireless device of claim 8, wherein:
said first portion of each cycle occurs before said second portion.

13. The wireless device of claim 8, wherein:
communication within said first portion of each cycle is coordinated by a piconet coordinator (PNC) and communication within said second portion is not coordinated by a PNC.

14. The wireless device of claim 8, wherein:
said controller causes an ad hoc beacon to be transmitted within said at least one ad hoc time slot.

15. The wireless device of claim 14, wherein:
said ad hoc beacon includes a request to send (RTS) packet.

16. The wireless device of claim 14, wherein:
said ad hoc beacon includes an indication of the communication task to be carried out within said at least one ad hoc time slot.

17. A wireless device comprising:
at least one dipole antenna;
a wireless transceiver coupled to said at least one dipole antenna; and
a controller to control communication between said wireless device and a wireless network, wherein said controller is programmed to: (a) monitor wireless communication within a network channel for at least a time period T to identify ad hoc time slots that are not currently being used by other wireless devices, said time period T being a duration of a repetitive cycle within said network channel, wherein said ad hoc time slots are time slots that can only be used for non-centrally coordinated communication, (b) select at least one ad hoc time slot from those identified, (c) begin to transmit within said at least one ad hoc time slot, and (d) cease transmission within said at least one time slot when a predetermined condition is detected, wherein each cycle of duration T within said network channel includes a first portion for centrally coordinated wireless communication and a second portion for non-centrally coordinated wireless communication, said second portion including a plurality of ad hoc time slots and said first portion including no ad hoc time slots.

18. The wireless device of claim 17, wherein:
said predetermined condition includes at least one of: a collision being detected within said at least one time slot and a clear to send (CTS) indication not being properly received within said at least one time slot.

19. The wireless device of claim 17, wherein:
said controller selects said at least one ad hoc time slot at random from the identified ad hoc time slots.

20. The wireless device of claim 17, wherein:
said duration T of said repetitive cycle does not change with time but durations of said first and second portions of said repetitive cycle are permitted to change with time.

21. An article comprising a computer readable storage medium having instructions stored thereon that, when executed by a computing platform, operate to:
monitor a network channel from a wireless data device for at least a time period T to identify ad hoc time slots that are not currently being used by other data devices, said time period T being a duration of a repetitive cycle within said network channel, wherein said ad hoc time slots are time slots that can only be used for non-centrally coordinated communication;

select at least one time slot from the identified ad hoc time slots for use in transmitting data from said wireless data device;

begin to transmit within said at least one time slot; and cease transmission within said at least one time slot when a predetermined condition is detected within said at least one time slot;

wherein each cycle of duration T within said network channel includes a first portion for centrally coordinated wireless communication and a second portion for non-centrally coordinated wireless communication, said second portion including a plurality of ad hoc time slots and said first portion including no ad hoc time slots.

22. The article of claim 21, wherein:
said predetermined condition includes at least one of: a collision being detected within said at least one time slot and a clear to send (CTS) indication not being properly received within said at least one time slot.

23. The article of claim 21, wherein said instructions, when executed, further operate to:
repeat operation to monitor, select, and begin to transmit after ceasing transmission.

24. The article of claim 21, wherein:
said duration T of said repetitive cycle does not change with time but durations of said first and second portions of said repetitive cycle are permitted to change with time.

* * * * *